United States Patent Office 3,165,444
Patented Jan. 12, 1965

3,165,444
COMPOSITIONS AND METHOD FOR THE TREATMENT OF VASCULAR SPASMS
Daniel Bertin, Montrouge, France, assignor to Roussel-UCLAF, Paris, France, a corporation of France
No Drawing. Filed Apr. 17, 1962, Ser. No. 188,226
Claims priority, application France, Apr. 22, 1961, Patent 859,596
6 Claims. (Cl. 167—65)

The invention relates to a novel method of treating vascular spasms by administration of 1'-(5β-androstane-3α-ol-11-one-17β-yl)-3',5',8'-trioxabicyclo-(2,2,2)-octane and its derivatives. The invention also relates to novel compositions for the treatment of vascular spasms.

In commonly assigned, copending patent application Serial No. 172,039, filed January 23, 1962, now U.S. Patent No. 3,079,385, 1'-(5β-androstane-3α-ol-11-one-17β-yl)-3',5',8'-trioxabicyclo-(2,2,2)-octane and its esters are disclosed as intermediates for the preparation of 3α-acetoxy-20-bis-(hydroxymethyl)-5β-pregnane-21-ol-11-one. It has now been discovered that the said compound and its 3α-esters and ethers have interesting pharmacological properties.

1'-(5β-androstane-3α-ol-11-one-17β-yl)-3',5',8'-trioxabicyclo-(2,2,2)-octane possesses a coronary dilatory activity and a spasmolytic activity particularly marked on vascular spasms. It can be used for treatment of spasms of coronary origin, arterial or venous spasms. The 3α-esters and ethers possess the same activity since they are hydrolyzed to the free alcohol by the body.

It is an object of the invention to provide novel compositions for the treatment of vascular spasms.

It is another object of the invention to provide a novel method for the treatment of vascular spasms.

These and other objects and advantages of the invention will become obvious from the following detailed description.

The compositions of the invention are comprised of a compound having the formula

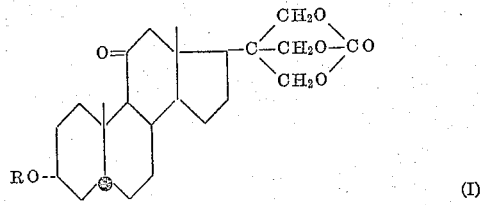

(I)

wherein R is selected from the group consisting of hydrogen, an acyl radical of an organic carboxylic acid having 1 to 18 carbon atoms and a lower alkyl radical and a pharmaceutical carrier.

The acyl radical of the organic carboxylic acid having 1 to 18 carbon atoms may be derived from an aliphatic, aromatic, cycloaliphatic or heterocyclic carboxylic acid. Examples of suitable acids are alkanoic acids such as formic acid, acetic acid, propionic acid, butyric acid, isobutyric acid, valeric acid, isovaleric acid, trimethyl acetic acid, caproic acid, β-trimethyl propionic acid, heptanoic acid, caprylic acid, pelarginic acid, capric acid, undecylic acid, lauric acid, myristic acid, palmitic acid and stearic acid; alkenoic acids such as undecylenic acid and oleic acid; cycloalkyl carboxylic acids such as cyclopentyl carboxylic acid, cyclopropyl carboxylic acid, cyclobutyl carboxylic acid and cylohexyl carboxylic acid; cycloalkyl alkanoic acids such as cyclopentyl acetic acid, cyclohexyl acetic acid, cyclopentyl propionic acid and cyclohexyl propionic acid; arylalkanoic acids such as phenyl acetic acid and phenyl propionic acid; aryl carboxylic acids such as benzoic acid and 2,4-dinitrobenzoic acid; phenoxy alkanoic acids such as phenoxy acetic acid, p-chlorophenoxy acetic acid, 2,4-dichlorophenoxy acetic acid, 4-terbutylphenoxy acetic acid, 3-phenoxy propionic acid and 4-phenoxy butyric acid; heterocyclic carboxylic acids such as furane-2-carboxylic acid, 5-ter-butylfurane-2-carboxylic acid, 5-bromofurane-2-carboxylic acid and nicotinic acids; β-ketoalkanoic acids, such as acetylacetic acid, propionyl-acetic acid and butyryl-acetic acid; amino acids such as diethylaminoacetic acid and aspartic acid.

The compositions of the invention may be prepared in the form of injectable solutions or suspensions, prepared in ampules, in the form of multiple-dose flacons, in the form of tablets, in the form of aromatized suspensions and in the form of suppositories according to the usual methods. The useful individual dose is controlled between 10 and 50 mg.

The compounds of Formula I are prepared as described in the said copending application Serial No. 172,039 by esterifying 20-bis-(hydroxymethyl)-5β-pregnane-3α,21-diol-11-one with an alkyl orthoformate such as ethyl orthoformate in the presence of an acid catalyst such as p-toluene sulfonic acid to form 1'-(5β-androstane-3α-ol-11-one-17β-yl)-3',5',8'-trioxabicyclo-(2,2,2)-octane which may then be subjected to reaction with an acylating agent such as acetic acid anhydride to form the corresponding 3α-acyloxy compound or with a lower alkylation agent to form the corresponding 3-lower alkoxy compound. The reaction scheme is illustrated in Table I.

TABLE I

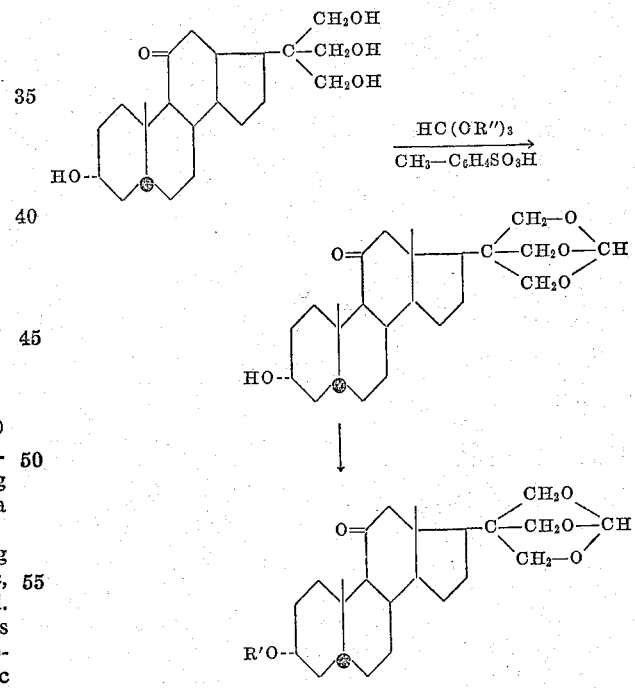

wherein R' is selected from the group consisting of a lower alkyl radical and an acyl radical of an organic carboxylic acid having 1 to 18 carbon atoms and R" is a lower alkyl radical.

The 20-bis-(hydroxymethyl)-5β-pregnane-3α,21-diol-11-one is prepared according to the process of copending, commonly assigned application Serial No. 174,692, filed February 21, 1962, now Patent No. 3,120,518, which is described in Comptes Rendus de l'Academie des Sciences, vol. 254 (1962), pp. 42–46. The reaction scheme is summarized in Table II.

TABLE II

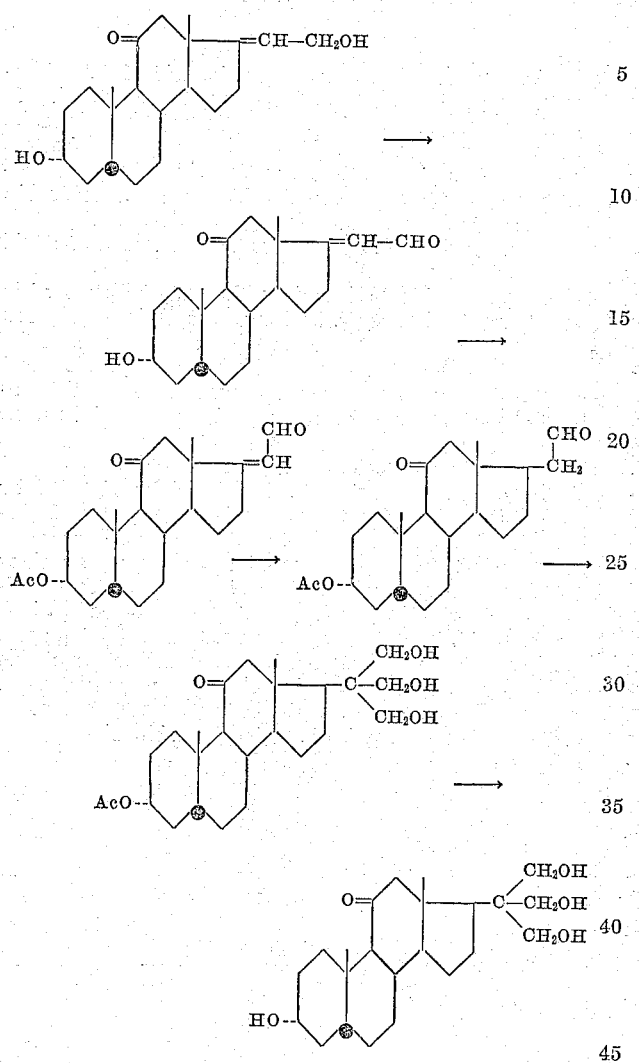

wherein Ac is an acyl radical such as acetyl.

As examples of the compounds used in the composition, there is 1'-(5β-androstane-3α-ol-11-one-17β-yl)-3',5',8'-trioxabicyclo-(2,2,2)-octane which occurs in the form of a colorless compound, soluble in benzene and chloroform, slightly soluble in ether and insoluble in water and which has an instantaneous melting point determined on the Kofler block of 230° C.

*Analysis.*—$C_{24}H_{36}O_5$ (molecular weight=404.53): Calculated: C, 71.25%; H, 8.97%. Found: C, 71.5%; H, 9.1.

Infrared spectra (chloroform) is in accord with the structure.

Another example is 1'-(3α-acetoxy-5β-androstane-11-one-17β-yl)-3',5',8'-trioxabicyclo-(2,2,2)-octane which occurs in the form of a solid colorless compound, soluble in benzene and chloroform, slightly soluble in alcohol and ether, very slightly soluble in aqueous propylene glycol and insoluble in water and which has an instantaneous melting point determined on the Kofler block of 243° C.

The method of the invention comprises administering an effective amount of a compound of Formula I daily. The compounds of Formula I may be administered by oral, perlingual, transcutaneous or rectal methods. The useful daily dosage varies from 25 to 100 mg. depending upon the method of administration.

In the following examples there are described several preferred embodiments to illustrate the invention. However, it should be understood that the invention is not intended to be limited to the specific embodiments.

*Pharmacological Study of 1'-(5β-Androstane-3α-Ol-11-One-17β-Yl)-3',5',8'-Trioxabicyclo-(2,2,2)-Octane*

A. DETERMINATION OF THE SPASMOLYTIC EFFECT ON THE CONTRACTION OF THE SMALL INTESTINE OF GUINEA PIGS

An isolated intestinal loop was suspended in an isolated organ container of 10 cc. containing Tyrode liquid maintained at 37° C. and constantly oxygenated.

(a) *Contracture by barium chloride.*—The contracture of the intestine was provoked by 200 to 300 gammas per cc. of barium chloride. 1'-(5β-androstane-3α-ol-11-one-17β-yl)-3',5',8'-trioxabicyclo-(2,2,2)-octane was added to the bath at the maximum of the contracture and the minimum concentration provoking partial decontraction and total decontraction was determined. A concentration of 5 gammas per cc. of the product provoked a progressive decontraction of about 50%. A concentration of 15 to 20 gammas per cc. brought about a total decontraction. Under the same conditions papaverine hydrochloride produced a total decontraction only at greater concentrations.

(b) *Contracture by acetylcholine.*—The contracture of the intestine was provoked by the addition of 0.02 gamma per cc. of acetylcholine to the Tyrode liquid. A partial decontraction was obtained with a concentration of 1 to 5 gammas per cc. of the compound. The total decontraction was obtained with 5 to 10 gammas per cc. of the compound. At a concentration of 10 gammas per cc., the compound is capable of totally inhibiting the action of a new addition of acetylcholine.

(c) *Contracture by histamine.*—The contraction of the intestine was obtained by the addition of 0.005 gamma per cc. of histamine. A total decontraction was obtained by the addition of 5 gammas per cc. of the compound. This same concentration caused the inhibition of the contracting effect of histamine. This effect was durable and resisted repeated washings.

B. DETERMINATION OF THE SPASMOLYTIC EFFECT ON THE ISOLATED BILE VESICULE OF GUINEA PIGS

This test was made under the conditions described by Chiray et al., Revue du Foie, 1943 (2nd series), and by using the vesicule of guinea pigs fasting for a period of 24 hours. The contracture was provoked by the addition of barium chloride in a concentration of 20 gammas per cc. 1'-(5β-androstane-3α-ol-11-one-17β-yl)-3',5',8'-trioxabicyclo-(2,2,2)-octane inhibited this spasm at a concentration of 1 to 2 gammas per cc.

C. ACTION ON CORONARY BLOOD FLOW

The study of the action of the compound on coronary blood flow was made on the isolated rabbit heart by using a technique inspired by Langendorf (Arch. gesam. Physiol., 1895, 61, 291). In this method, the heart was suspended by the aorta to a cannula and the coronary system was perfused by means of this cannula under a constant pressure of 5 cc. of mercury with Locke serum of a pH of 7.2 to 7.3, heated to 37° C. The compound studied was placed in solution in ethanol and this solution was diluted by means of Locke serum to the concentration desired.

On a proper apparatus, the coronary blood flow and the ventricular contractions were registered. The threshold concentration of the compound which clearly augmented the blood flow of such a preparation was systematically searched for and the table below furnishes the results obtained with this compound, as well as with trinitrine and papaverine under the same experimental conditions.

TABLE III

| Compounds studied | Threshold active concentration in μg. per cc. in the perfusion liquid | Increase in coronary blood flow in percent of normal blood flow | Duration of action in minutes | Effects on ventricular contractions | |
|---|---|---|---|---|---|
| | | | | On the amplitude, percent | On the frequency, percent |
| Trinitrine | 1 | 10 | 2 to 20 | 0 | −5 |
| Papaverine | 10 | 20 | 15 | 0 | 0 |
| 1'-(5β-androstane-3α-ol-11-one-17β-yl)-3',5',8'-trioxabicyclo-(2,2,2)-octane | 0.01 to 0.1 | 20 | 15 | −10 to −20 | −7 |

D. DETERMINATION OF THE VASOMOTOR EFFECT ON THE ISOLATED RABBIT PAW

This test was made according to a technique described by Binet et al. (Presse Medicale 1949, p. 445). The blood of an animal anesthetized with urethane was drawn from the carotid and re-injected by means of a Jouvelet transfusion apparatus under a constant blood flow into the femoral artery of the isolated paw. A manometer attached to the outlet of the transfusion apparatus permitted the registration of the pressure in the paw which gives a reading corresponding to the degree of the vasodilation or vasoconstriction. The beginning of the vasoconstruction was provoked by the injection of 5 mg./kg. of barium chloride.

1'-(5β-androstane-3α-ol-11-one-17β-yl)-3',5',8'-trioxabicyclo-(2,2,2)-octane was dissolved in a concentration of 10 mg./cc. in a solvent miscible in water. The effect of the said compound on the peripheral circulation could be seen at a dose of 1 mg./kg. injected intravenously. A second injection of the same dose effected an important and long lasting lowering of the arterial pressure in the isolated paw so that the arterial pressure returned almost to the value which it had before the injection of barium chloride.

*Acute Toxicity*

The toxicity tests were made on mice of the Rockland strain weighing between 18 and 22 grams. 1'-(5β-androstane-3α-ol-11-one-17β-yl)-3',5',8'-trioxabicyclo-(2,2,2)-octane was utilized in suspension containing 10 mg./cc. in distilled water containing polysorbate 80. It was injected in this form, after dilution in the case of the slighter dose, by subcutaneous methods into two groups of ten mice at doses of 50 and 100 mg./kg., respectively, in a volume of 0.2 cc. per 20 grams of mice.

The animals were held under observation for a period of 48 hours. No symptoms of intoxication nor mortality were noted in the course of this period. 1'-(5β-androstane-3α-ol-11-one-17β-yl)-3',5',8'-trioxabicyclo-(2,2,2)-octane is thus devoid of toxicity even at a dose of 100 mg./kg. administered to mice by subcutaneous methods.

Various modifications of the compositions and method of the invention may be made without departing from the spirit or scope thereof, and it is to be understood that the invention is to be limited only as defined in the appended claims.

I claim:

1. A method for controlling vascular spasms which comprises administering to an animal having vascular spasms 25 to 100 mg. of a compound having the formula

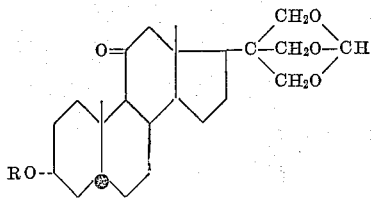

wherein R is selected from the group consisting of hydrogen, lower alkyl and an acyl radical of an organic carboxylic acid having 1 to 18 carbon atoms.

2. The method of claim 1 wherein the compound is 1'-(3α-acetoxy-5β-androstane-11-one-17β-yl)-3',5',8'-trioxabicyclo-(2,2,2)-octane.

3. The method of claim 1 wherein the compound is (1'-(5β-androstane-3α-ol-11-one-17β-yl)-3',5',8'-trioxabicyclo-(2,2,2)-octane.

4. A spasmalytic composition comprising 10 to 50 mg. of a compound having the formula

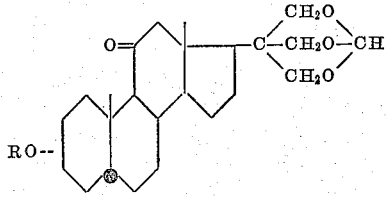

wherein R is selected from the group consisting of hydrogen, lower alkyl and an acyl radical of an organic carboxylic acid having 1 to 18 carbon atoms and a pharmaceutical carrier.

5. The composition of claim 4 wherein the compound is 1'-(3α-acetoxy-5β-androstane-11-one-17β-yl)-3',5',8'-trioxabicyclo-(2,2,2)-octane.

6. The composition of claim 4 wherein the compound is 1'-(5β-androstane-3α-ol-11-one-17β-yl)-3',5',8'-trioxabicyclo-(2,2,2)-octane.

References Cited by the Examiner

UNITED STATES PATENTS 3,079,385  2/63  Bertin et al. _____ 167—65
3,114,676  12/63  Bertin et al. _____ 167—65

LEWIS GOTTS, *Primary Examiner.*

FRANK CACCIAPAGLIA, Jr., *Examiner.*